(12) United States Patent
Hwang et al.

(10) Patent No.: US 9,297,453 B2
(45) Date of Patent: Mar. 29, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Jin Young Hwang, Busan (KR); Taehwan Wi, Bucheon-si (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 626 days.

(21) Appl. No.: 13/727,376

(22) Filed: Dec. 26, 2012

(65) Prior Publication Data
US 2014/0060680 A1 Mar. 6, 2014

(30) Foreign Application Priority Data

Sep. 3, 2012 (KR) .................. 10-2012-0097307

(51) Int. Cl.
*F04C 23/00* (2006.01)
*F04B 23/08* (2006.01)
*F04B 23/12* (2006.01)
*F16H 57/04* (2010.01)
*F04C 11/00* (2006.01)
*F16H 61/00* (2006.01)

(52) U.S. Cl.
CPC .............. *F16H 57/04* (2013.01); *F04C 11/001* (2013.01); *F04C 23/001* (2013.01); *F16H 57/0441* (2013.01); *F16H 57/0446* (2013.01); *F16H 61/0025* (2013.01); *F04B 23/08* (2013.01); *F04B 23/12* (2013.01); *F16H 2061/0037* (2013.01); *Y10T 137/86139* (2015.04)

(58) Field of Classification Search
CPC ........ F04C 14/02; F04C 23/00; F04C 23/001; F04C 11/001; F04B 23/08; F04B 23/12
USPC .................. 417/253, 521; 418/209, 210, 215
See application file for complete search history.

(56) References Cited

U.S. PATENT DOCUMENTS 4,415,319 A * 11/1983 Masuda et al. ................ 418/135
2012/0141302 A1* 6/2012 Hwang ......................... 417/253

* cited by examiner

*Primary Examiner* — Peter J Bertheaud
(74) *Attorney, Agent, or Firm* — Morgan, Lewis & Bockius LLP

(57) ABSTRACT

A hydraulic pressure supply system of an automatic transmission may generate low hydraulic pressure and high hydraulic pressure using oil stored in an oil pan and may supply the low hydraulic pressure and the high hydraulic pressure respectively to a low pressure portion and a high pressure portion. In the hydraulic pressure supply system, a low-pressure hydraulic pump pumping the oil stored in the oil pan and generating the low hydraulic pressure and a high-pressure hydraulic pump changing the low hydraulic pressure supplied from the low-pressure hydraulic pump into the high hydraulic pressure and supplying the high hydraulic pressure to the high pressure portion may be integrated as one hydraulic pump.

6 Claims, 2 Drawing Sheets

HYDRAULIC PRESSURE SUPPLY SYSTEM OF AUTOMATIC TRANSMISSION

CROSS-REFERENCE TO RELATED APPLICATION

The present application claims priority of Korean Patent Application Number 10-2012-0097307 filed Sep. 3, 2012, the entire contents of which application is incorporated herein for all purposes by this reference.

BACKGROUND OF INVENTION

1. Field of Invention

The present invention relates to a hydraulic pressure supply system of an automatic transmission for a vehicle. More particularly, the present invention relates to a hydraulic pressure supply system of an automatic transmission for a vehicle which can supply low hydraulic pressure and high hydraulic pressure respectively to a low pressure portion and a high pressure portion using one hydraulic pump.

2. Description of Related Art

Recently, vehicle makers direct all their strength to improve fuel economy due to worldwide high oil prices and strengthen of exhaust gas regulations.

Improvement of fuel economy may be achieved by improving power delivery efficiency in an automatic transmission, and improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Since power consumption for driving the hydraulic pumps can be minimized, fuel economy may be enhanced. In addition, since a load applied to the hydraulic pumps is reduced, noise and vibration may be reduced and durability may be improved.

In a conventional hydraulic pressure supply system, the low-pressure hydraulic pump and the high-pressure hydraulic pump are driven by one drive shaft or the low-pressure hydraulic pump is driven by driving torque of an engine and the high-pressure hydraulic pump is driven by driving torque of a motor.

If the low-pressure hydraulic pump and the high-pressure hydraulic pump are separately provided, a structure of the automatic transmission may be complex and weight of the automatic transmission may increase.

In addition, manufacturing cost may increase and it may be hard to mount the hydraulic pumps if two hydraulic pumps are used.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydraulic pressure supply system of an automatic transmission for a vehicle having advantages of reducing weight and manufacturing cost and improving mountability as a consequence of supplying low hydraulic pressure and high hydraulic pressure respectively to a low pressure portion and a high pressure portion using one hydraulic pump.

A hydraulic pressure supply system of an automatic transmission for a vehicle according to one aspect of the present invention may generate low hydraulic pressure and high hydraulic pressure using oil stored in an oil pan and may supply the low hydraulic pressure and the high hydraulic pressure respectively to a low pressure portion and a high pressure portion.

In the hydraulic pressure supply system, a low-pressure hydraulic pump pumping the oil stored in the oil pan and generating the low hydraulic pressure and a high-pressure hydraulic pump changing the low hydraulic pressure supplied from the low-pressure hydraulic pump into the high hydraulic pressure and supplying the high hydraulic pressure to the high pressure portion may be integrated as one hydraulic pump.

The one hydraulic pump may be a vane pump. A low-pressure pumping region may be formed at a portion and a high-pressure pumping region may be formed at the other portion with respect to a vane including a rotor, and the low hydraulic pressure and the high hydraulic pressure are simultaneously discharged per one rotation of the vane.

The low-pressure pumping region may include: a first inlet connected to the oil pan through an input line; and a first outlet discharging the hydraulic pressure supplied through the first inlet as low pressure.

The high-pressure pumping region may include: a second inlet connected to the first outlet through a connecting hydraulic line; and a second outlet discharging the hydraulic pressure supplied through the second inlet as high pressure.

Volume of the low-pressure pumping region may be larger than that of the high-pressure pumping region.

Various aspects of the present invention provide for a hydraulic pressure supply system of an automatic transmission for a vehicle that may include: a low-pressure hydraulic pump driven by an engine, pumping oil stored in an oil pan, and generating low hydraulic pressure; a low-pressure regulator valve controlling the hydraulic pressure supplied from the low-pressure hydraulic pump to pressure demanded by a low pressure portion; a high-pressure hydraulic pump changing the low hydraulic pressure supplied from the low-pressure hydraulic pump into high hydraulic pressure and supplying the high hydraulic pressure to a high pressure portion; and a high-pressure regulator valve controlling the high hydraulic pressure supplied from the high-pressure hydraulic pump to pressure demanded by the high pressure portion.

The low-pressure hydraulic pump and the high-pressure hydraulic pump may be integrated as one vane pump such that the low hydraulic pressure and the high hydraulic pressure are simultaneously discharged per one rotation of a vane.

The one vane pump may be provided with a low-pressure pumping region formed at a portion with respect to the vane including a rotor and a high-pressure pumping region formed at the other portion with respect to the vane such that the low hydraulic pressure is discharged from the low-pressure pumping region and the high hydraulic pressure is discharged from the high-pressure pumping region per one rotation of the vane.

The low-pressure pumping region may include: a first inlet connected to the oil pan through an input line; and a first outlet discharging the hydraulic pressure supplied through the first inlet as low pressure.

The high-pressure pumping region may include: a second inlet connected to the first outlet through a connecting hydraulic line; and a second outlet discharging the hydraulic pressure supplied through the second inlet as high pressure.

Volume of the low-pressure pumping region may be larger than that of the high-pressure pumping region.

In a hydraulic pressure supply system of an automatic transmission for a vehicle according various aspects of the present invention, a low-pressure hydraulic pump pumping the oil stored in the oil pan and generating the low hydraulic pressure and a high-pressure hydraulic pump changing the low hydraulic pressure supplied from the low-pressure hydraulic pump into the high hydraulic pressure and supplying the high hydraulic pressure to the high pressure portion may be integrated as one vane pump.

The one vane pump may include: a pump housing provided with a cam ring receiving portion formed at a center portion, a first inlet and a first outlet formed respectively at both lower side portions of the cam ring receiving portion, and a second inlet and a second outlet formed respectively at both upper side portions of the cam ring receiving portion, the first outlet and the second inlet being connected through a connecting hydraulic line; a cam ring fixedly mounted in the cam ring receiving portion of the pump housing and provided with a cam hole formed at a center portion of the cam ring; a rotor disposed at an upward eccentric position from a center of the cam hole, and connected to and driven by a drive shaft; and a vane disposed at an external circumferential portion of the rotor along a circumferential direction with even distance so as to be slidable radially, and provided with a free end portion contacting with an interior circumference of the cam hole.

The first inlet may be connected to the oil pan through an input line, the first outlet may be connected to the low pressure portion through a low-pressure line, and the second outlet may be connected to the high pressure portion through a high-pressure line.

The one vane pump may be provided with a low-pressure pumping region formed at a portion with respect to the vane and a high-pressure pumping region formed at the other portion with respect to the vane such that the low hydraulic pressure and the high hydraulic pressure are simultaneously discharged per one rotation of the vane.

The low-pressure pumping region may include the first inlet and the first outlet.

The high-pressure pumping region may include the second inlet and the second outlet.

Volume of the low-pressure pumping region may be larger than that of the high-pressure pumping region.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
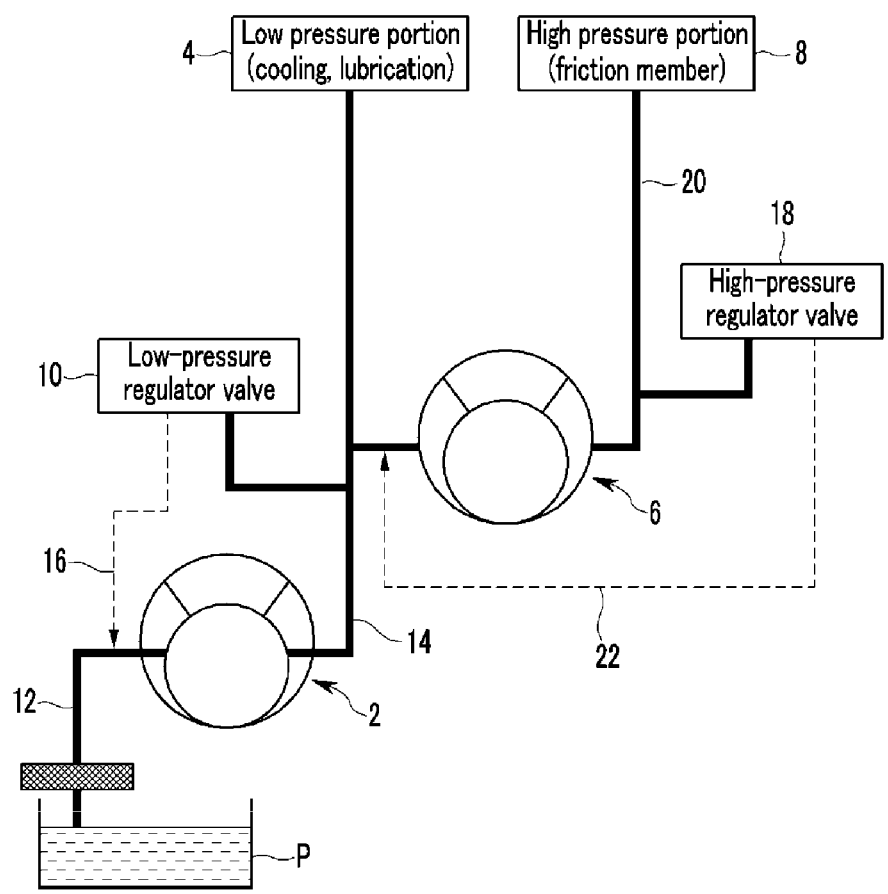
FIG. 1 is a schematic diagram of an exemplary hydraulic pressure supply system of an automatic transmission according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system of an automatic transmission according to various embodiments of the present invention.

Referring to FIG. 1, a hydraulic pressure supply system according to various embodiments of the present invention is adapted to supply low hydraulic pressure generated by a low-pressure hydraulic pump 2 to a low pressure portion 4 such as a torque converter (T/C), a cooling portion, a lubrication portion and to supply high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The hydraulic pressure generated by the low-pressure hydraulic pump 2 is controlled to a stable hydraulic pressure by a low-pressure regulator valve 10 and is then supplied to the low pressure portion 4.

That is, the low-pressure hydraulic pump 2 receives oil stored in an oil pan P through an input line 12 and discharges the low hydraulic pressure to a low-pressure line 14.

In addition, the low-pressure regulator valve 10 is connected to the low-pressure line 14 and is connected to the input line 12 through a first recirculation line 16.

Therefore, the low-pressure regulator valve 10 flows a portion of the hydraulic pressure supplied through the low-pressure line 14 back to the input line 12 through the first recirculation line 16 so as to adjust the hydraulic pressure.

The hydraulic pressure generated by the high-pressure hydraulic pump 6 is controlled to a stable hydraulic pressure by a high-pressure regulator valve 18 and is then supplied to the high pressure portion 8.

The high-pressure hydraulic pump 6 changes the low hydraulic pressure supplied from the low-pressure hydraulic pump 2 into the high hydraulic pressure and supplies the high hydraulic pressure to the high pressure portion 8 through a high-pressure line 20.

That is, the high-pressure regulator valve 18 is connected to the high-pressure line 20 and is connected to the low-pressure line 14 through a second recirculation line 22. Therefore, the high-pressure regulator valve 18 recirculates a portion of the hydraulic pressure supplied through the high-pressure line 20 through the second recirculation line 22 so as to adjust the hydraulic pressure.

Therefore, the low hydraulic pressure generated by the low-pressure hydraulic pump 2 is supplied to the low pressure portion 4 and the high hydraulic pressure generated by the high-pressure hydraulic pump 6 is supplied to the high pressure portion 8.

In the hydraulic pressure supply system of an automatic transmission according to various embodiments of the present invention, the low-pressure hydraulic pump 2 and the high-pressure hydraulic pump 6 are integrated as one unit.

Figure 2:
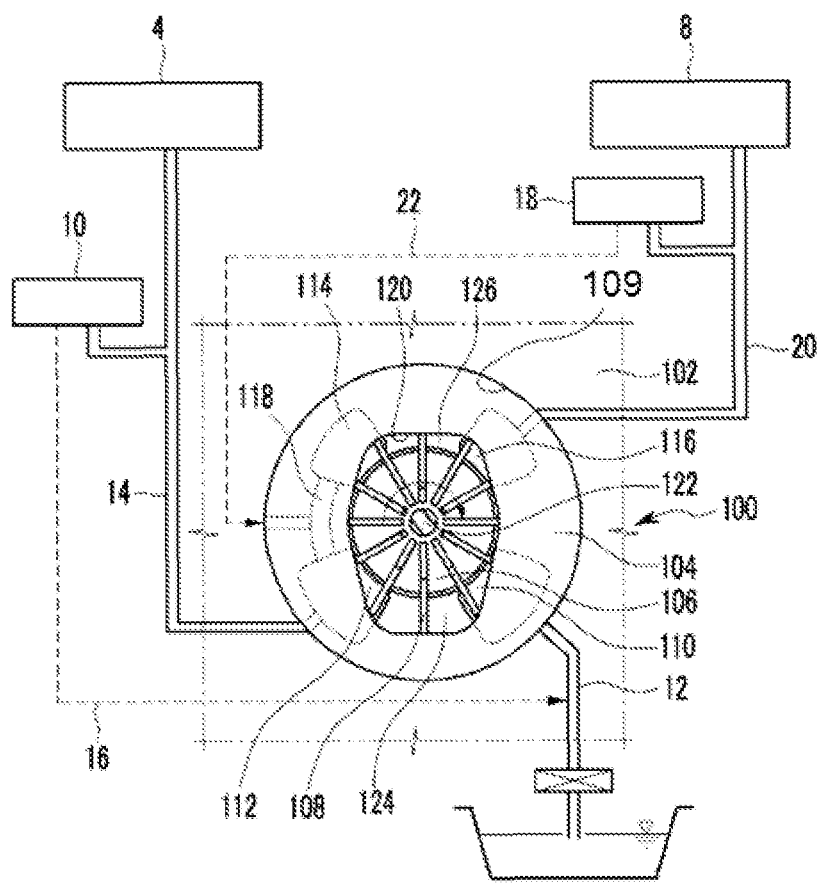
FIG. 2 is a schematic diagram of an exemplary hydraulic pump used for a hydraulic pressure supply system according to the present invention.

FIG. 2 is a schematic diagram of hydraulic pump used for a hydraulic pressure supply system according to various embodiments of the present invention.

Referring to FIG. 2, a hydraulic pump 100 according to various embodiments of the present invention is formed by integrating the low-pressure hydraulic pump 2 and the high-pressure hydraulic pump 6.

That is, the hydraulic pump 100 is a vane pump and includes a pump housing 102, a cam ring 104, a rotor 106, and vanes 108.

A cam ring receiving portion 109 for accommodating the cam ring 104 is formed at a center portion of the pump housing 102. A first inlet 110 and a first outlet 112 are formed respectively at both lower side portions of the cam ring receiving portion 109, a second inlet 114 and a second outlet 116 are formed respectively at both upper side portions of the cam ring receiving portion 109, and the first outlet 112 and the second inlet 114 are connected through a connecting hydraulic line 118.

In addition, the first inlet 110 is connected to the oil pan P through the input line 12, the first outlet 112 is connected to the low pressure portion 4 through the low-pressure line 14, and the second outlet 116 is connected to the high pressure portion 8 through the high-pressure line 20.

The cam ring 104 is fixedly mounted in the cam ring receiving portion 109 of the pump housing 102, and a cam hole 120 having a vertical length thereof is longer than a horizontal length is formed at a center portion of the cam ring 104.

The rotor 106 is disposed at an upward eccentric position from a center of the cam hole 120, and is connected to and driven by a drive shaft 122.

The vanes 108 are disposed at an external circumferential portion of the rotor 106 so as to be slidable radially. The vanes 108 are disposed along a circumferential direction with even distance, and a free end portion of each vane 108 contacts with an interior circumference of the cam hole 120.

Therefore, if the hydraulic pump 100 according to various embodiments of the present invention is driven by the drive shaft 122, the vanes 108 rotate with the rotor 106 and the hydraulic pump 100 performs pumping operation.

At this time, the oil flowing through the first inlet 110 is discharged to the first outlet 112 and the connecting hydraulic line 118 such that the low hydraulic pressure is generated, and the oil flowing into the second inlet 114 is discharged through the second outlet 116 such that the high hydraulic pressure is generated.

Since the rotor 106 is offset upwardly in the cam hole 120, a low-pressure pumping region 124 is formed between a lower portion of the rotor 106 and the cam hole 120 and a high-pressure pumping region 126 is formed between an upper portion of the rotor 106 and the cam hole 120.

Volumes of the low-pressure pumping region 124 and the high-pressure pumping region 126 are set according to the low hydraulic pressure and the high hydraulic pressure, and the volume of the low-pressure pumping region 124 is larger than the volume of the high-pressure pumping region 126.

That is, the low hydraulic pressure generated by the low-pressure pumping region 124 is controlled by the low-pressure regulator valve 10, and a portion of the low hydraulic pressure is supplied to the high-pressure pumping region 126. After that, the portion of the low hydraulic pressure is changed into the high hydraulic pressure, and the high hydraulic pressure is controlled to be stable by the high-pressure regulator valve 18 and is then supplied to the high pressure portion 8.

Therefore, the hydraulic pump 100 according to various embodiments of the present invention discharges the low hydraulic pressure and the high hydraulic pressure per one rotation of the drive shaft 122 so as to supply the low hydraulic pressure and the high hydraulic pressure respectively to the low pressure portion 4 and the high pressure portion 8.

In the hydraulic pump 100 according to various embodiments of the present invention, a lower portion in the drawings is operated as the low-pressure hydraulic pump 2 and an upper portion in the drawings is operated as the high-pressure hydraulic pump 6.

Since functions of two hydraulic pumps 2 and 6 are achieved by one hydraulic pump 100, power loss during operation of the hydraulic pump may be minimized and fuel economy may be improved. In addition, weight and size may be reduced.

In addition, since only one hydraulic pump 100 instead of two hydraulic pumps 2 and 6 is used, occurrence of failure may be reduced and operational reliability of the automatic transmission may be improved.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, the system comprising:

a low-pressure hydraulic pump pumping the oil stored in the oil pan and generating the low hydraulic pressure; and a high-pressure hydraulic pump changing the low hydraulic pressure supplied from the low-pressure hydraulic pump into the high hydraulic pressure and supplying the high hydraulic pressure to the high pressure portion;

wherein the low-pressure hydraulic pump and the high-pressure hydraulic pump are integrated as one vane pump, wherein the one vane pump comprises:

a pump housing provided with a cam ring receiving portion formed at a center portion, a first inlet and a first outlet formed respectively at lower side portions of the cam ring receiving portion, and a second inlet and a second outlet formed respectively at upper side portions of the cam ring receiving portion, the first outlet and the second inlet being connected through a connecting hydraulic line;

a cam ring fixedly mounted in the cam ring receiving portion of the pump housing and provided with a cam hole formed at a center portion of the cam ring;

a rotor disposed at an upward eccentric position offset from a center of the cam hole, and connected to and driven by a drive shaft; and a vane disposed at an external circumferential portion of the rotor along a circumferential direction with even distance so as to be slidable radially, and provided with a free end portion contacting with an interior circumference of the cam hole.

2. The hydraulic pressure supply system of claim 1, wherein the first inlet is connected to the oil pan through an input line, the first outlet is connected to the low pressure portion through a low-pressure line, and the second outlet is connected to the high pressure portion through a high-pressure line.

3. The hydraulic pressure supply system of claim 1, wherein the one vane pump is provided with a low-pressure pumping region formed at a first portion with respect to the vane and a high-pressure pumping region formed at a second portion with respect to the vane such that the low hydraulic pressure and the high hydraulic pressure are simultaneously discharged per one rotation of the vane.

4. The hydraulic pressure supply system of claim 3, wherein the low-pressure pumping region comprises the first inlet and the first outlet.

5. The hydraulic pressure supply system of claim 3, wherein the high-pressure pumping region comprises the second inlet and the second outlet.

6. The hydraulic pressure supply system of claim 3, wherein volume of the low-pressure pumping region is larger than that of the high-pressure pumping region.

* * * * *